(12) United States Patent
Mittal et al.

(10) Patent No.: US 11,108,735 B2
(45) Date of Patent: Aug. 31, 2021

(54) MAPPING SUBNETS IN DIFFERENT VIRTUAL NETWORKS USING PRIVATE ADDRESS SPACE

(71) Applicant: Microsoft Technology Licensing, LLC, Redmond, WA (US)

(72) Inventors: Sumeet Mittal, Woodinville, WA (US); Rishabh Tewari, Sammamish, WA (US); Abhishek Shukla, Redmond, WA (US); Abhishek Ellore Sreenath, Bangalore (IN); Sandesh Kerehali Shankaranarayan Shety, Redmond, WA (US); Ajinkya Potdar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 16/435,158

(22) Filed: Jun. 7, 2019

(65) Prior Publication Data
US 2020/0389428 A1 Dec. 10, 2020

(51) Int. Cl.
*H04L 29/12* (2006.01)
*H04L 12/46* (2006.01)
(Continued)

(52) U.S. Cl.
CPC ...... *H04L 61/2592* (2013.01); *H04L 12/4641* (2013.01); *H04L 45/745* (2013.01);
(Continued)

(58) Field of Classification Search
CPC combination set(s) only.
See application file for complete search history.

(56) References Cited

U.S. PATENT DOCUMENTS

| 7,260,648 B2 | 8/2007 | Tingley et al. |
| 7,751,391 B2 | 7/2010 | Boden et al. |

(Continued)

FOREIGN PATENT DOCUMENTS

| CN | 104038747 A | 9/2014 |
| JP | 2013065923 A | 4/2013 |

(Continued)

OTHER PUBLICATIONS

Davis, et al., "Trajectory precision of micromachined scanning mirrors for laser beam scanning pico-projector displays", In Proceedings of the SPIE—The International Society for Optical Engineering, Feb. 2, 2012, 11 Pages.

(Continued)

*Primary Examiner* — Sargon N Nano
*Assistant Examiner* — Kidest Mendaye
(74) *Attorney, Agent, or Firm* — Ray Quinney & Nebeker; Thomas M. Hardman; Sunah K. Lee

(57) ABSTRACT

A method for facilitating communication between resources in different virtual networks includes creating a first virtual network and a second virtual network within a cloud computing system and creating a first subnet within the first virtual network and a second subnet within the second virtual network. The method also includes mapping the first subnet to the second subnet such that the resources in the first subnet and the second subnet are able to communicate with each other using private address space. The method also includes routing data packets between the first subnet and the second subnet.

20 Claims, 11 Drawing Sheets

(51) Int. Cl.
*H04L 12/741* (2013.01)
*H04L 29/06* (2006.01)
*H04L 29/08* (2006.01)

(52) U.S. Cl.
CPC ........ *H04L 61/106* (2013.01); *H04L 61/2567* (2013.01); *H04L 63/0272* (2013.01); *H04L 61/6068* (2013.01); *H04L 67/1078* (2013.01); *H04L 2212/00* (2013.01)

(56) References Cited

U.S. PATENT DOCUMENTS

| | | | | |
|---|---|---|---|---|
| 7,953,865 B1* | 5/2011 | Miller | ............ | H04L 29/06 709/227 |
| 7,991,859 B1* | 8/2011 | Miller | ............ | H04L 45/02 709/220 |
| 8,282,222 B2 | 10/2012 | Smits | | |
| 8,371,698 B2 | 2/2013 | Brown | | |
| 8,488,446 B1* | 7/2013 | Brandwine | ............ | H04L 45/22 370/225 |
| 8,619,779 B2* | 12/2013 | Li | ............ | H04L 45/04 370/392 |
| 9,807,057 B1 | 10/2017 | Deb et al. | | |
| 9,832,118 B1* | 11/2017 | Miller | ............ | H04L 63/0272 |
| 9,873,717 B2* | 1/2018 | Kelly | ............ | A61P 25/24 |
| 10,320,750 B1* | 6/2019 | Brandwine | ............ | H04L 63/1433 |
| 10,862,796 B1* | 12/2020 | Dickinson | ............ | H04L 63/1408 |
| 2008/0144150 A1 | 6/2008 | Champion et al. | | |
| 2010/0073748 A1 | 3/2010 | Holmes et al. | | |
| 2013/0031544 A1 | 1/2013 | Sridharan et al. | | |
| 2013/0332927 A1* | 12/2013 | Tang | ............ | G06F 9/45558 718/1 |
| 2014/0052949 A1* | 2/2014 | Wang | ............ | H04L 43/0817 711/162 |
| 2014/0337500 A1* | 11/2014 | Lee | ............ | H04L 67/10 709/223 |
| 2015/0195196 A1* | 7/2015 | Patel | ............ | H04L 12/4641 370/392 |
| 2016/0173338 A1* | 6/2016 | Wolting | ............ | H04L 67/1097 709/223 |
| 2016/0373356 A1 | 12/2016 | Xu et al. | | |
| 2019/0007366 A1* | 1/2019 | Voegele | ............ | H04L 61/305 |

FOREIGN PATENT DOCUMENTS

| | | |
|---|---|---|
| JP | 2016148763 A | 8/2016 |
| JP | 2017083657 A | 5/2017 |

OTHER PUBLICATIONS

"International Search Report and Written Opinion Issued in PCT Application No. PCT/US20/030169", dated Jul. 28, 2020, 13 Pages.
Bradford, et al., "Live Wide-Area Migration of Virtual Machines Including Local Persistent State", In Proceedings of the 3rd International Conference on Virtual Execution Environments, Jun. 13, 2007, pp. 169-179.
"Using Network Address Translation (NAT) to avoid IP address conflicts", Retrieved form: https://web.archive.org/web/20180118091016/https:/help.skytap.com/Network_Address_Translation.html, 5 Pages.
"Set up IPSec VPN", Retrieved from: https://cloud.ibm.com/docs/infrastructure/iaas-vpn?topic=VPN-setup-ipsec-vpn#setup-ipsec-vpn, Mar. 6, 2019, 4 Pages.

* cited by examiner

MAPPING SUBNETS IN DIFFERENT VIRTUAL NETWORKS USING PRIVATE ADDRESS SPACE

CROSS-REFERENCE TO RELATED APPLICATIONS

N/A

BACKGROUND

Cloud computing is the delivery of computing services (e.g., servers, storage, databases, networking, software, analytics) over the Internet. Many different types of services may be provided by a cloud computing system, including services based on a software as a service (SaaS) model, services based on a platform as a service (PaaS) model, and services based on infrastructure as a service (IaaS) model.

Broadly speaking, a cloud computing system includes two sections, a front end and a back end, that are in electronic communication with one another via the Internet. The front end includes the interface that users encounter through a client device. The back end includes the resources that deliver cloud-computing services, including processors, memory, storage, and networking hardware. The back end of a cloud computing system typically includes one or more data centers, which may be located in different geographical areas. Each data center typically includes a large number (e.g., hundreds or thousands) of computing devices, which may be referred to as host machines.

At least some of the services that are offered by a cloud computing service provider may utilize virtualization technologies that allow computing resources to be shared by multiple users. For example, virtualization technologies allow a single physical computing device to be shared among multiple users by providing each user with one or more virtual machines hosted by the single physical computing machine. Each such virtual machine may act as a distinct logical computing system, and the various virtual machines may be isolated from one another. As another example, virtualization technologies allow data storage hardware to be shared among multiple users by providing each user with a virtual data store. Each such virtual data store may act as a distinct logical data store, and the various virtual data stores may be isolated from one another.

Virtualization technologies may also be used in the context of computer networking. Network virtualization involves combining hardware and software network resources and network functionality into a software-based administrative entity, which may be referred to as a virtual network. A cloud computing service provider may enable users (e.g., customers) to create virtual networks within a cloud computing system. The use of network virtualization technologies in the context of a cloud computing environment is sometimes referred to as software-defined networking.

Resources may be assigned to virtual networks. In this context, the term "resource" may refer to any item that is capable of being managed by a cloud computing system. Some examples of resources include virtual machines, virtual data stores, databases, and web applications. The resources within a virtual network may communicate with each other and with other entities that are accessible via the Internet.

Computing devices use Internet protocol (IP) addresses to send and receive data from other devices. There are two different categories of IP addresses: public and private. A public IP address is a globally unique IP address assigned to a computing device. A public IP address can be accessed over the Internet. A private IP address, on the other hand, is not globally unique, and IP packets that contain private IP addresses cannot be routed through the public Internet. Private network addresses are not allocated to any specific organization and anyone may use these addresses without approval from a regional Internet registry. Private IP addresses are commonly used for local area networks (LANs) in residential, office, and enterprise environments.

The set of IP addresses that are assigned to a particular network may be referred to as the "address space" of that network. A private IP address space can be specified for a virtual network. Resources in a virtual network may be assigned a private IP address from the address space that is defined for the virtual network. The address spaces of two different virtual networks may overlap.

Currently, there are two different approaches for enabling resources in one virtual network to communicate with resources in another virtual network. Both approaches, however, have significant drawbacks. With one approach, at least one entity in each virtual network may be assigned a public IP address, and communication between the virtual networks may occur via the public Internet. However, exposing the resources in the virtual networks to the public IP address space raises security concerns. With another approach, a technique known as virtual network peering may enable resources in two different virtual networks to be able to communicate with each other. However, for virtual network peering to work properly, the address spaces of both virtual networks cannot overlap. This can be a significant limitation, especially for virtual networks whose address spaces were designed without this requirement in mind.

SUMMARY

In accordance with one aspect of the present disclosure, a method is disclosed for facilitating communication between resources in different virtual networks in a cloud computing system. The method includes mapping a first subnet in a first virtual network to a second subnet in a second virtual network such that resources in the first subnet and the second subnet are able to communicate with each other. The method also includes providing a representative resource in the first subnet of the first virtual network. The representative resource may correspond to a resource in the second subnet of the second virtual network. The method also includes creating a first mapping between a representative resource address and a host machine address. The representative resource address may correspond to the representative resource in the first subnet, and the host machine address may correspond to a host machine on which the resource in the second subnet is located. The method also includes creating a second mapping between the representative resource address and a resource address corresponding to the resource in the second subnet, and routing a data packet from the first virtual network to the resource in the second subnet of the second virtual network based on the first mapping and the second mapping.

At least some resources in the first virtual network that are outside the first subnet may be isolated from the second virtual network. At least some resources in the second virtual network that are outside the second subnet may be isolated from the first virtual network.

The method may further include mapping a first plurality of resources in the first subnet to a first plurality of representative resources in the second subnet and mapping a second plurality of resources in the second subnet to a second plurality of representative resources in the first subnet.

A first address space associated with the first virtual network may overlap with a second address space associated with the second virtual network. Communication between the resources in the first subnet and the second subnet may occur within private Internet protocol (IP) address space.

The data packet may include a first source address and a first destination address. The first source address may be associated with a first resource in the first virtual network. The first destination address may be associated with the representative resource in the first subnet in the first virtual network. The method may further include accessing the first mapping between the representative resource address and the host machine address to determine an additional destination address and encapsulating the data packet to create an encapsulated data packet. The encapsulated data packet may include the additional destination address.

As another example, the first source address may be associated with a first resource in the first virtual network. The first destination address may be associated with the representative resource in the first subnet in the first virtual network. The method may further include performing network address translation to create a translated data packet.

Performing network address translation may include accessing the second mapping between the representative resource address and the resource address to determine a second destination address and replacing the first destination address with the second destination address. Performing network address translation may additionally include accessing a third mapping between the first resource in the first subnet and a second source address. The second source address may be associated with the second virtual network. Performing network address translation may additionally include replacing the first source address with the second source address.

The method may further include receiving a request from a client device to map the first subnet to the second subnet. The mapping may be performed in response to the request.

In accordance with another aspect of the present disclosure, a method for facilitating communication between resources in different virtual networks is disclosed. The method includes receiving a request to add a first resource in a first virtual network to a first subnet within the first virtual network. The first subnet may be mapped to a second subnet in a second virtual network. The method also includes automatically creating a first mapping between the first resource in the first subnet and a representative resource in the second subnet in response to the request. The method also includes receiving a data packet that is addressed to the representative resource in the second subnet. The data packet may be sent by a second resource in the second virtual network. The method also includes routing the data packet to the first resource in the first subnet based on the first mapping.

When the first subnet is mapped to the second subnet, at least some resources in the first virtual network that are outside the first subnet may be isolated from the second virtual network. Similarly, at least some resources in the second virtual network that are outside the second subnet may be isolated from the first virtual network.

A first address space associated with the first virtual network may overlap with a second address space associated with the second virtual network. The routing of the data packet may occur within private Internet protocol (IP) address space.

A source address of the data packet may be associated with the second resource in the second virtual network. A destination address of the data packet may be associated with the representative resource in the second subnet in the second virtual network. The method may additionally include accessing the first mapping between the first resource in the first subnet and the representative resource in the second subnet to determine an address of the first resource. The method may additionally include obtaining, based on the address of the first resource, a host machine address corresponding to a host machine on which the first resource is located. The method may additionally include encapsulating the data packet to create an encapsulated data packet. The encapsulated data packet may include the host machine address.

The data packet may include a first source address and a first destination address. The first source address may be associated with the second resource in the second virtual network. The first destination address may be associated with the representative resource in the second subnet in the second virtual network. The method may further include performing network address translation to create a translated data packet. Performing network address translation may include accessing the first mapping between the first resource in the first subnet and the representative resource in the second subnet to determine a second destination address corresponding to the first resource. Performing network address translation may additionally include replacing the first destination address with the second destination address. Performing network address translation may additionally include accessing a second mapping between the first resource in the first subnet and a second source address. The second source address may be associated with the first virtual network. Performing network address translation may additionally include replacing the first source address with the second source address.

In accordance with another aspect of the present disclosure, a cloud computing system that is configured to facilitate communication between subnets of different virtual networks is disclosed. The cloud computing system includes one or more processors and memory in electronic communication with the one or more processors. The cloud computing system also includes a virtual network management service that is executable by the one or more processors to map a first subnet of a first virtual network to a second subnet of a second virtual network. The cloud computing system also includes mapping information stored in the memory. The mapping information may be created by the virtual network management service in connection with mapping the first subnet to the second subnet. The mapping information may enable resources in the first subnet and the second subnet to communicate with each other. The cloud computing system also includes a routing component that is executable by the one or more processors to route data packets between the first subnet and the second subnet based on the mapping information.

When the first subnet is mapped to the second subnet, at least some resources in the first virtual network that are outside the first subnet may be isolated from the second virtual network. Similarly, at least some resources in the second virtual network that are outside the second subnet may be isolated from the first virtual network.

A first address space associated with the first virtual network may overlap with a second address space associated with the second virtual network. Routing of the data packets between the first subnet and the second subnet may occur within private Internet protocol (IP) address space.

The mapping information may include a first set of mappings between a first plurality of resources in the first subnet and a first plurality of representative resources in the second subnet. The mapping information may also include a second set of mappings between a second plurality of resources in the second subnet and a second plurality of representative resources in the first subnet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by preference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to enabling resources in different virtual networks to communicate with each other. Advantageously, the systems and methods disclosed herein enable communication between resources in different virtual networks to occur using private IP addresses. In other words, communication between resources in different virtual networks may occur without requiring data packets to be sent over the Internet using public IP addresses. In addition, the techniques disclosed herein enable resources in different virtual networks to communicate with each other even if the private address spaces of the virtual networks overlap.

To enable resources in different virtual networks to communicate with each other using private IP addresses and without requiring distinct address spaces, subnets in different virtual networks may be mapped to one another. Resources in the mapped subnets may then be able to communicate with each other using private IP addresses even if the address spaces of the virtual networks overlap.

For example, consider two different virtual networks, which will be referred to as virtual network A and virtual network B. It may be desirable to share one or more resources that exist in virtual network B with the resources in virtual network A. In other words, it may be desirable to enable resources in virtual network A to access and interact with one or more resources that exist in virtual network B (and vice versa). To enable this to occur, a subnet may be created within virtual network A. This subnet will be referred to as subnet A. Similarly, a subnet may be created within virtual network B. This subnet will be referred to as subnet B. Subnet A and subnet B may be mapped to one another.

To share resources from virtual network B with virtual network A, the resources may be added to subnet B. In some implementations, adding the resources to subnet B causes the resources to become mapped to representative resources in subnet A. In other words, for each resource that is added to subnet B, a representative resource may be created in subnet A and a one-to-one mapping may be created between the resource in subnet B and the representative resource in subnet A. Resources in subnet A may then interact with the resources in subnet B through the corresponding representative resources in subnet A. For example, the resources in subnet A may send data packets to the representative resources in subnet A. A data packet that is sent to a representative resource in subnet A may be routed to the corresponding resource in subnet B.

The systems and methods disclosed herein may be implemented in the context of a service provider that provides cloud computing services to users (e.g., customers). The services may be implemented in a cloud computing system that is maintained by the service provider.

Figure 1:
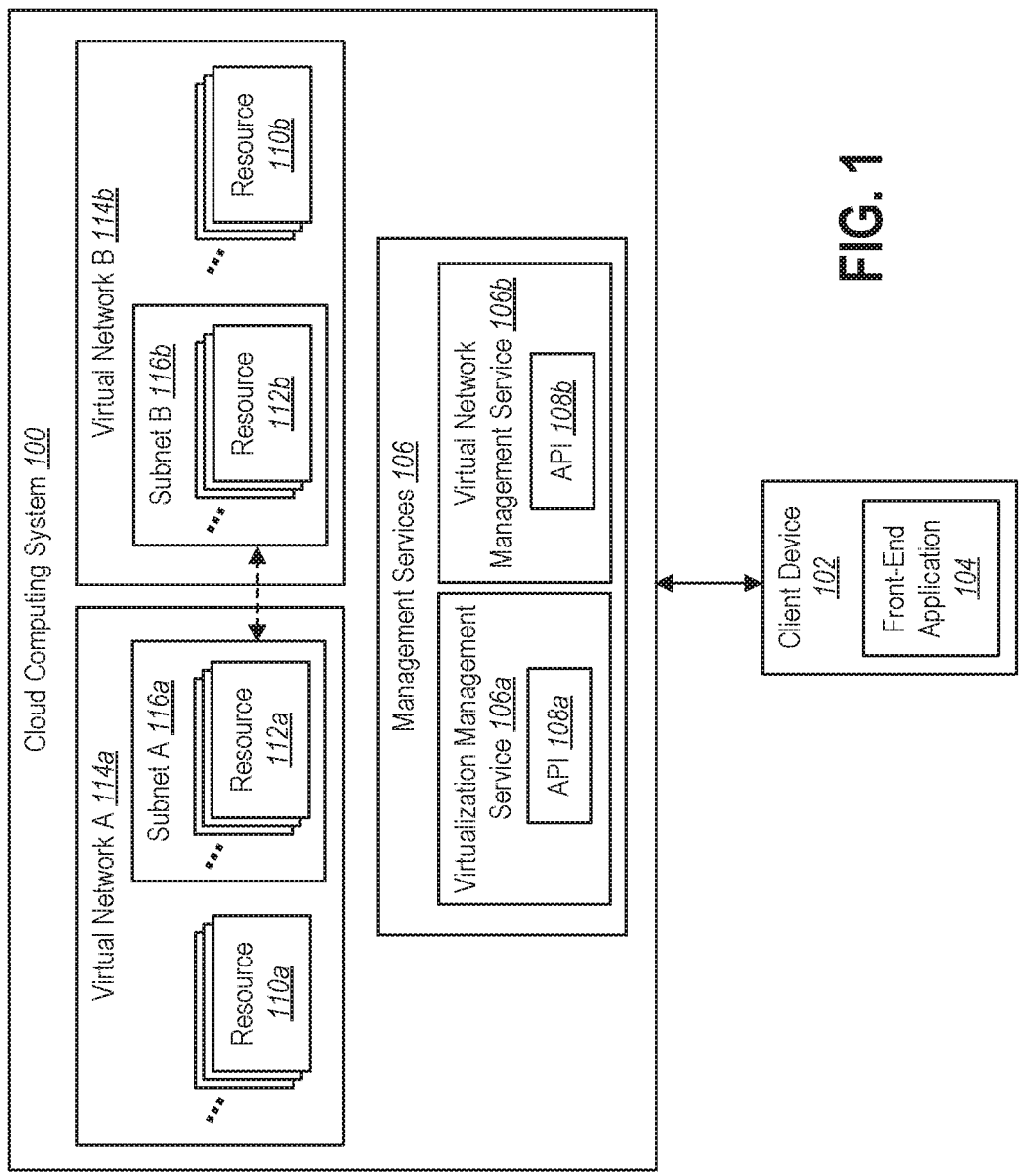
FIG. 1 illustrates an example of a cloud computing system that is configured to facilitate communication between resources in different virtual networks in accordance with the present disclosure.

FIG. 1 illustrates a client device 102 in electronic communication with a cloud computing system 100. Communication between the client device 102 and the cloud computing system 100 may occur via the Internet. The client device 102 includes a front-end application 104. In some implementations, the front-end application 104 may take the form of a web browser (possibly running one or more script files) or a mobile application. A user of the client device 102 may use the front-end application 104 to access one or more services 106 provided by the cloud computing system 100. The services 106 provided by the cloud computing system 100 may be accessed via application programming interfaces (APIs) corresponding to the services 106.

The cloud computing system 100 may include a virtualization management service 106*a* that facilitates the creation and operation of virtual computing resources such as virtual machines (VMs) and virtual data stores. The front-end application 104 on the client device 102 may access the virtualization management service 106*a* through a corresponding API 108*a*. Someone who uses the services 106 provided by the cloud computing system 100 (e.g., a customer of the service provider) may use the front-end application 104 on the client device 102 to access the virtualization management service 106*a*, via the API 108*a*, in order to provision virtual computing resources and perform various operations related to managing those virtual computing resources. The virtualization management service 106*a* may receive one or more requests from the front-end application 104 that are related to provisioning resources, and the virtualization management service 106*a* may provision the requested resources on the cloud computing system 100 in response to the request(s). FIG. 1 shows a plurality of resources 110*a-b*, 112*a-b* on the cloud computing system 100.

The cloud computing system 100 may also include a service 106*b* that is related to creating and managing virtual networks. This service 106*b* may be referred to herein as a virtual network management service 106*b*. The front-end application 104 on the client device 102 may access the virtual network management service 106*b* through a corresponding API 108*b*. Someone who uses the services 106 provided by the cloud computing system 100 may use the front-end application 104 on the client device 102 to access the virtual network management service 106*b*, via the API 108*b*, in order to perform various operations related to virtual networks.

For example, the functionality provided by the virtual network management service 106*b* may include provisioning virtual networks on the cloud computing system 100. The virtual network management service 106*b* may receive one or more requests from the front-end application 104 that are related to provisioning virtual networks, and the virtual network management service 106*b* may provision the requested virtual networks on the cloud computing system 100 in response to the request(s). FIG. 1 shows two virtual networks 114*a-b* within the cloud computing system 100. These virtual networks 114*a-b* will be referred to as virtual network A 114*a* and virtual network B 114*b*.

The functionality provided by the virtual network management service 106*b* may also include creating subnets within virtual networks. The virtual network management service 106*b* may receive one or more requests from the front-end application 104 that are related to creating subnets within virtual networks, and the virtual network management service 106*b* may create subnets within virtual networks in response to the request(s). FIG. 1 shows a subnet 116*a* within virtual network A 114*a* and a subnet 116*b* within virtual network B 114*b*. The subnet 116*a* within virtual network A 114*a* may be referred to herein as subnet A 116*a*, and the subnet 116*b* within virtual network B 114*b* may be referred to herein as subnet B 116*b*.

The functionality provided by the virtual network management service 106*b* may also include associating resources with particular virtual networks. The virtual network management service 106*b* may receive one or more requests from the front-end application 104 that are related to associating resources with virtual networks, and the virtual network management service 106*b* may associate resources with particular virtual networks in response to the request(s). In some implementations, the user of the front-end application 104 may provide user input that associates particular resources with particular virtual networks. Alternatively, the virtual network management service 106*b* may automatically associate resources with particular virtual networks (e.g., in response to creation of resources and/or creation of virtual networks). FIG. 1 shows a plurality of resources 110*a*, 112*a* that are associated with virtual network A 114*a* and a plurality of resources 110*b*, 112*b* that are associated with virtual network B 114*b*.

The functionality provided by the virtual network management service 106*b* may also include assigning IP addresses to resources in virtual networks. The virtual network management service 106*b* may receive one or more requests from the front-end application 104 that are related to assigning IP addresses to resources in virtual networks, and the virtual network management service 106*b* may assign IP addresses to resources in virtual networks in response to the request(s). In some implementations, the user of the front-end application 104 may provide user input that causes IP addresses to be assigned to resources. Alternatively, the virtual network management service 106*b* may automatically assign IP addresses to resources (e.g., in response to creation of the resources).

The IP addresses that are assigned to the resources of a virtual network may be private IP addresses. The set of IP addresses that are assigned to a particular virtual network may be referred to as the "address space" of that virtual network. If the resources in two different virtual networks have private IP addresses assigned to them, then the address spaces of those virtual networks may overlap with one another. In other words, the same private IP address may be assigned to different resources in different virtual networks.

As indicated above, the present disclosure proposes mapping subnets in different virtual networks to one another so that resources in the mapped subnets are able to communicate with each other using private IP addresses even if the address spaces of the virtual networks overlap. Thus, in accordance with the present disclosure, the functionality provided by the virtual network management service 106*b* may also include mapping subnets in different virtual networks to one another. The virtual network management service 106*b* may receive one or more requests from the front-end application 104 that are related to performing mapping operations, and the virtual network management service 106*b* may perform mapping operations in response to the request(s). For example, a user may cause the front-end application 104 to send a request to the virtual network management service 106*b* to map subnet A 116*a* and subnet B 116*b* to each other. The virtual network management service 106*b* may cause subnet A 116*a* and subnet B 116*b* to be mapped to each other in response to the request.

Mapping subnets in different virtual networks to one another makes it possible to share some of the resources in one virtual network with another virtual network without completely exposing everything in the virtual networks to one another. For example, suppose that a user (e.g., someone who owns or otherwise has management rights with respect to virtual network A 114*a* and virtual network B 114*b*) wants to share a set of resources 112*b* in virtual network B 114*b* with virtual network A 114*a*, so that the resources 110*a*, 112*a* in virtual network A 114*a* are able to interact with the resources 112*b* that have been shared. However, further suppose that the user does not want to share other resources 110*b* in virtual network B 114*b* with virtual network A 114*a*. In other words, the user does not want to expose any information (e.g., address information) about the other resources 110*b* in virtual network B 114*b* to virtual network A 114*a*, so that these other resources 110*b* remain isolated from virtual network A 114*a*. The user may accomplish this by causing subnet B 116*b* and subnet A 116*a* to be mapped to each other (e.g., through user input submitted via the front-end application 104), and then adding the resources 112*b* that the user wants to share with virtual network A 114*a* to subnet B 116b. The resources 110a, 112b in virtual network A 114a are then able to interact with the resources 112b that have been added to subnet B 116b. However, virtual network A 114a remains unaware of the other resources 110b in virtual network B 114b (i.e., the resources 110b in virtual network B 114b that have not been added to subnet B 116b). Therefore, these other resources 110b remain isolated from virtual network A 114a.

Similarly, if a user wants to share a set of resources 112a in virtual network A 114a with virtual network B 114b, the resources 112a that the user wants to share may be added to subnet A 116a. The resources 110b, 112b in virtual network B 114b are then able to interact with the resources 112a that have been added to subnet A 116a. However, virtual network B 114b remains unaware of the other resources 110a in virtual network A 114a (i.e., the resources 110a in virtual network A 114a that have not been added to subnet A 116a). Therefore, these other resources 110a remain isolated from virtual network B 114b.

Figure 2:
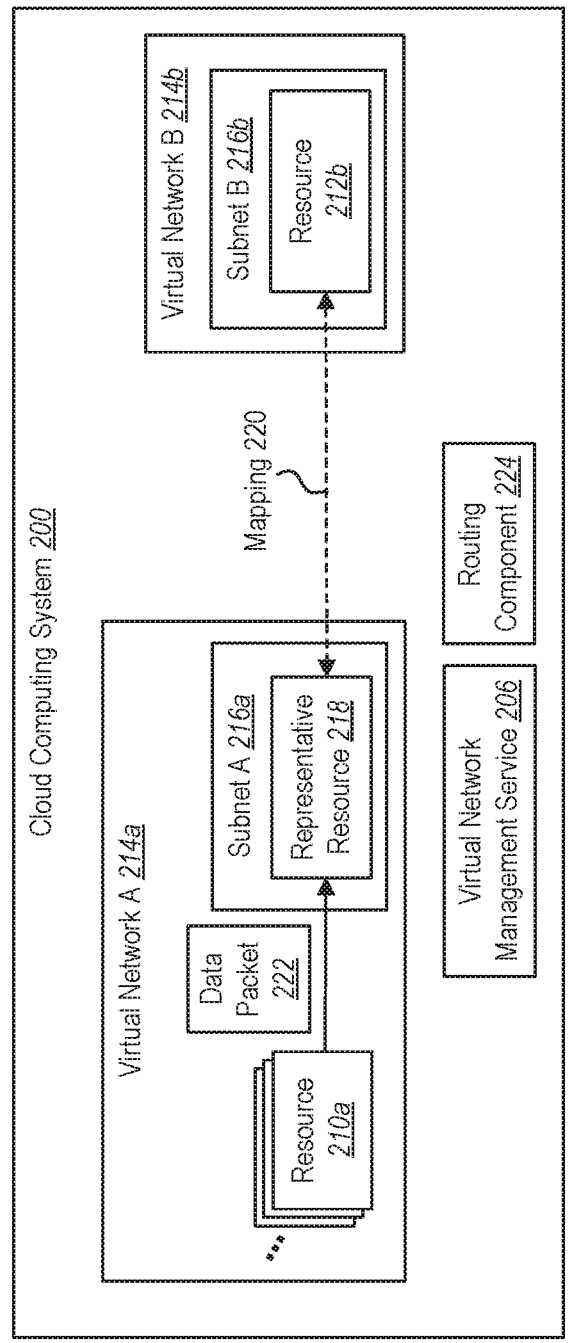
FIG. 2 illustrates an example in which a single resource in a virtual network is shared with another virtual network.

FIG. 2 illustrates an example involving a single resource 212b in virtual network B 214b may be shared with virtual network A 214a. As in the previous example, it will be assumed that subnet B 216b in virtual network B 214b is mapped to subnet A 216a in virtual network A 214a. When the user adds the resource 212b to subnet B 216b, a representative resource 218 may be created in subnet A 216a. This representative resource 218 may be mapped to the resource 212b in subnet B 216b. In other words, a one-to-one mapping 220 may be created between the resource 212b in subnet B 216b and the representative resource 218 in subnet A 216a. In some implementations, the representative resource 218 may be automatically created by the cloud computing system 200 (e.g., by a virtual network management service 206 provided by the cloud computing system 200) in response to the resource being added to subnet B 216b. In other words, once the user causes subnet B 216b to be mapped to subnet A 216a and causes the resource 212b to be added to subnet B 216b, the representative resource 218 may be created in subnet A 216a without additional user input.

A resource 210a in virtual network A 214a may communicate with the resource 212b in subnet B 216b by sending a data packet 222 to the corresponding representative resource 218 in subnet A 216a. The mapping 220 between the representative resource 218 in subnet A 216a and the resource 212b in subnet B 216b enables the data packet 222 to be routed from the representative resource 218 to the resource 212b. The cloud computing system 200 includes a routing component 224 that is responsible for routing data packets 222.

Figure 3A:
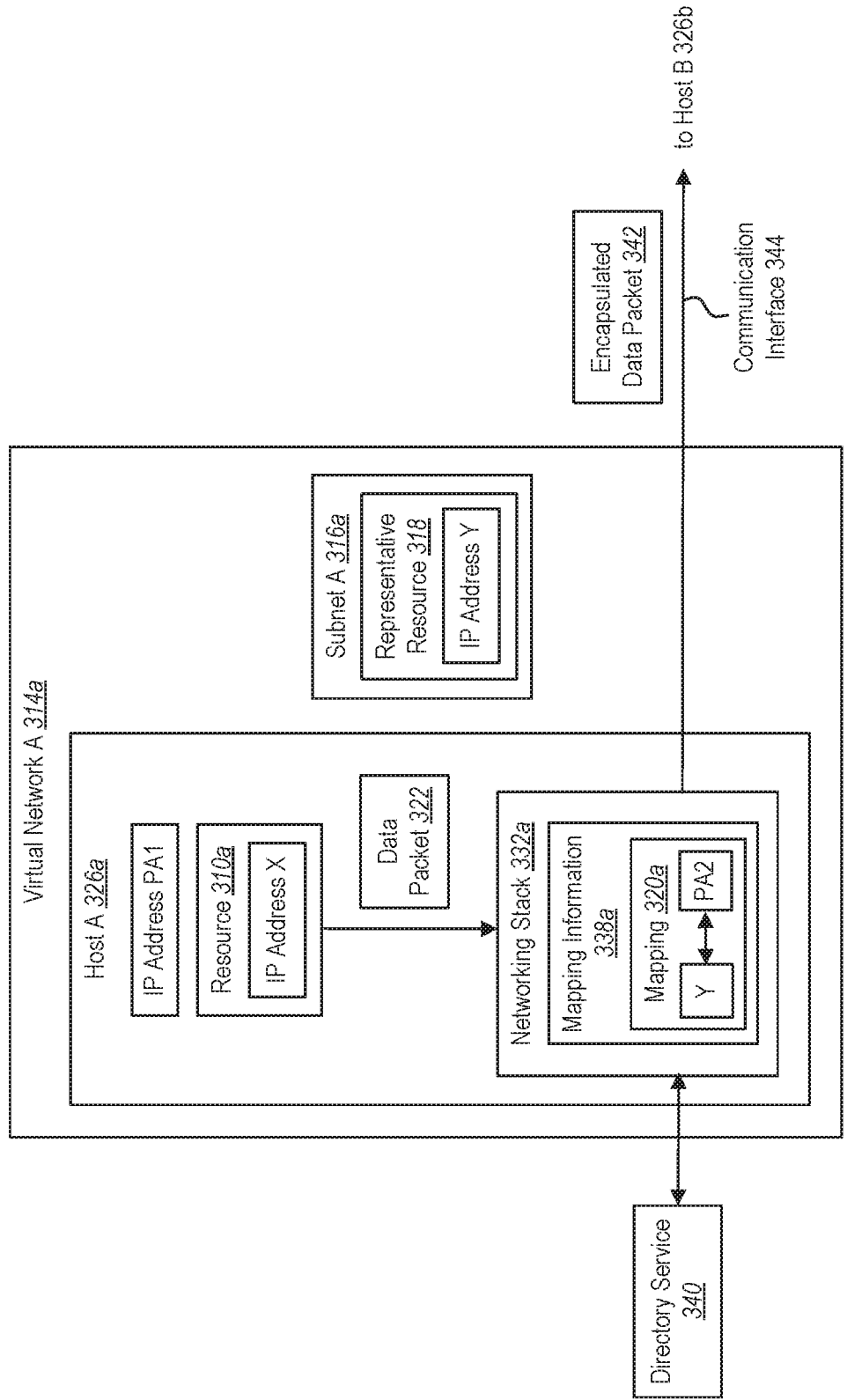
FIGS. 3A-3C illustrate an example showing how a resource in a first virtual network may communicate with a resource in a second virtual network through mapped subnets.
Figure 3B:
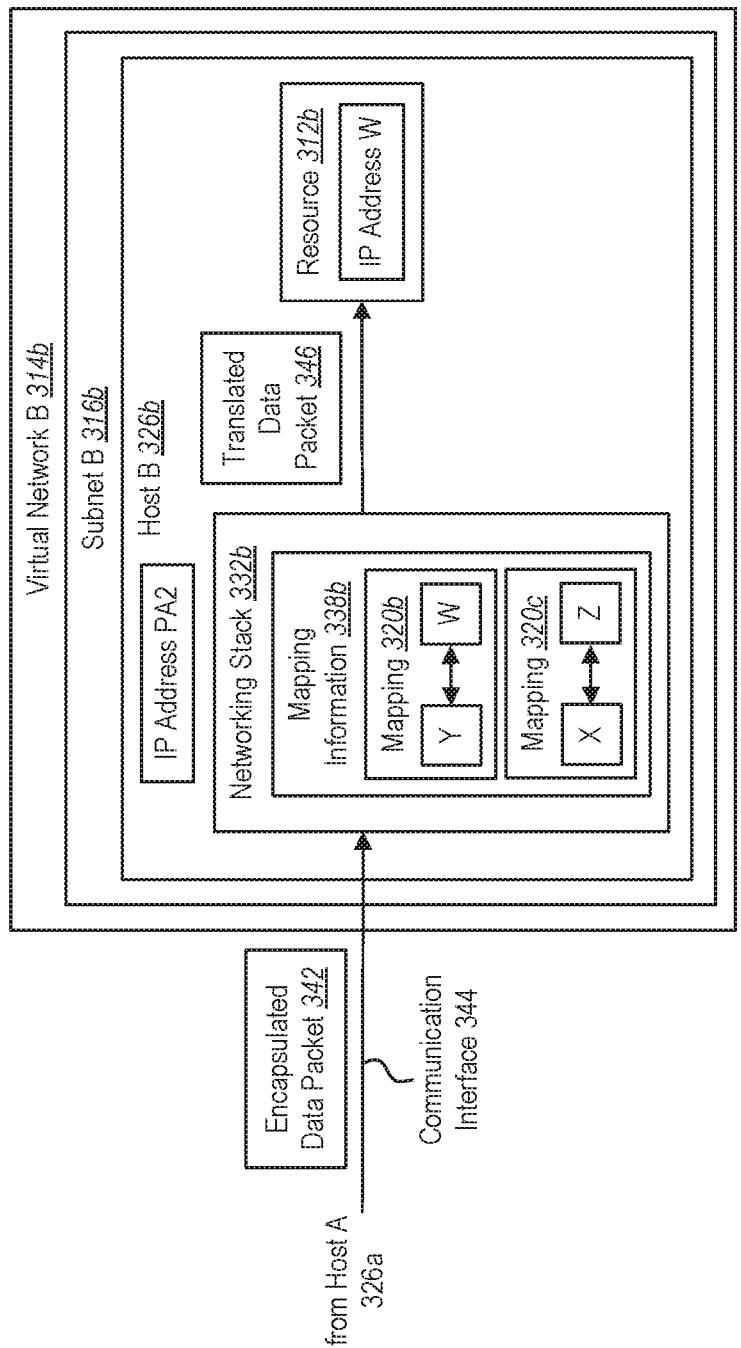
Figure 3C:
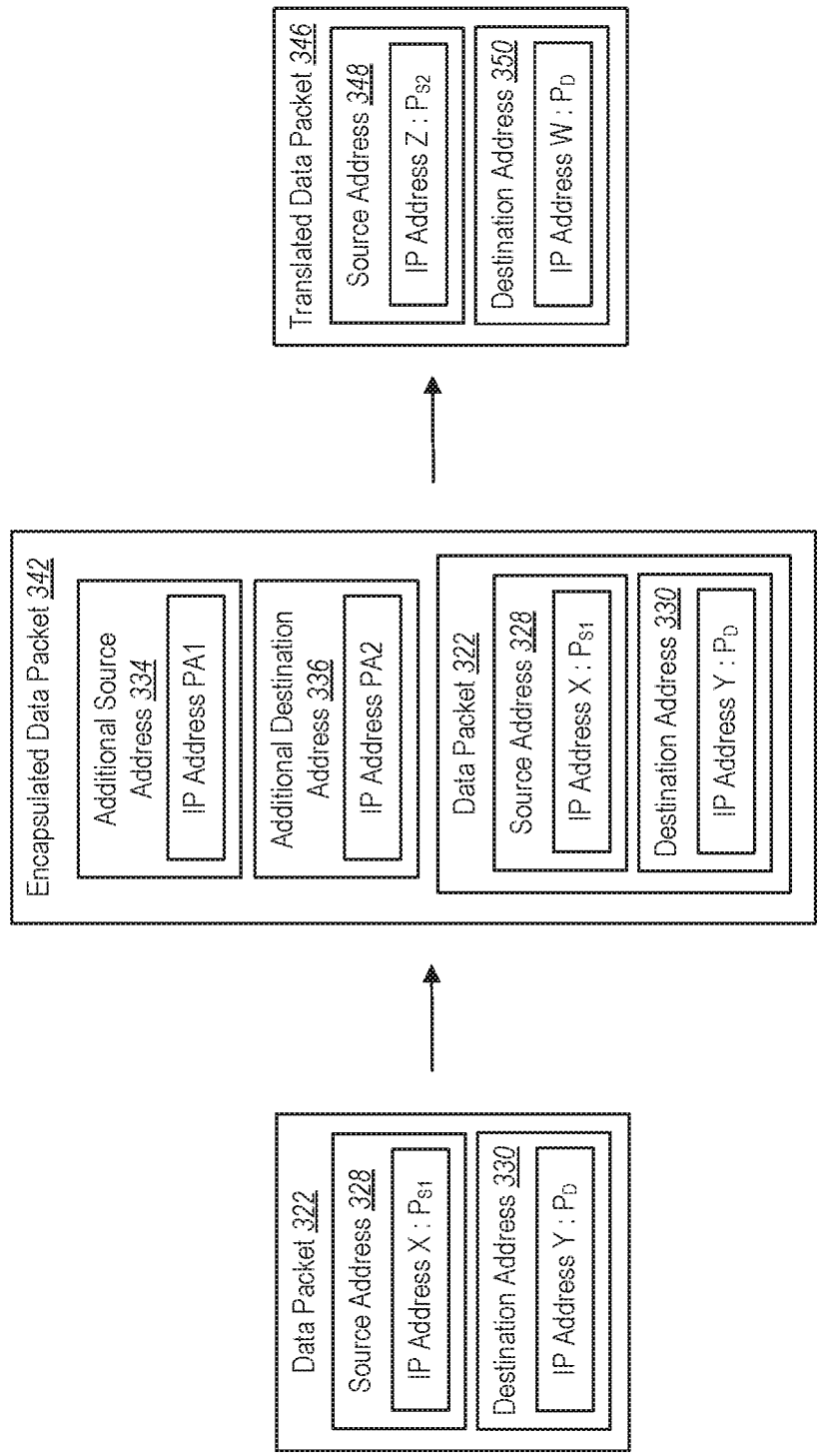

FIGS. 3A-C illustrate an example showing how a resource 310a in virtual network A 314a may communicate with a resource 312b in subnet B 316b of virtual network B 314b through a representative resource 318 in subnet A 316a.

In this example, the IP address that is associated with the resource 310a in virtual network A 314a will be referred to as IP address X. The IP address that is associated with the representative resource 318 in subnet A 316a of virtual network A 314a will be referred to as IP address Y. The IP address that is associated with the resource 312b in subnet B 316b of virtual network B 314b will be referred to as IP address W. The resource 310a in virtual network A 314a runs on a host machine that will be referred to herein as host A 326a. The resource 312b in subnet B 316b of virtual network B 314b runs on a host machine that will be referred to herein as host B 326b. The IP address of host A 326a will be referred to herein as IP address PM. The IP address of host B 326b will be referred to herein as IP address PA2. The IP addresses of the host machines 326a-b (PA1 and PA2) are physical IP addresses, whereas the other IP addresses (X, Y, and W) may be virtual IP addresses (i.e., IP addresses that are associated with virtualized resources).

To enable the resource 310a in virtual network A 314a (shown in FIG. 3A) to send a data packet 322 to the resource 312b in subnet B 316b of virtual network B 314b (shown in FIG. 3B), certain mapping information may be created. In particular, a one-to-one mapping 320a may be created between IP address Y (the IP address of the representative resource 318 in subnet A 316a) and IP address PA2 (the physical IP address of the host machine, host B 326b, on which the resource 312b is located). In addition, a one-to-one mapping 320b may be created between IP address Y and IP address W (the IP address of the resource 312b in subnet B 316b). Moreover, a one-to-one mapping 320c may be created between IP address X (the IP address of the resource 310a that originally sent the data packet 322) and another IP address, which will be referred to as IP address Z. The purpose of this mapping 320c will be discussed in greater detail below.

The resource 310a in virtual network A 314a initially creates the data packet 322 with a source address 328 and a destination address 330. The data packet 322 is shown in FIG. 3C. The source address 328 includes IP address X (the IP address of the resource 310a) and a port that will be referred to as port $P_{S1}$. The destination address 330 includes IP address Y (the IP address of the representative resource 318 in subnet A 316a) and a port that will be referred to as port $P_D$.

The data packet 322 is delivered to a networking stack 332a that is running on host A 326a. The networking stack 332a encapsulates the data packet 322 with an additional source address 334 and an additional destination address 336, thereby creating an encapsulated data packet 342. The additional source address 334 includes IP address PA1, which is the physical IP address of host A 326a (the host machine on which the resource 310a in virtual network A 314a is running). The additional destination address 336 is IP address PA2, which is the physical IP address of host B 326b (the host machine on which the resource 312b in subnet B 316b of virtual network B 314b is running). To determine the additional destination address 336, the networking stack 332a accesses mapping information 338a to identify the mapping 320a between IP address Y (which is identified in the destination address 330 of the data packet 322, and which is also the IP address of the representative resource 318 in subnet A 316a) and IP address PA2 (the physical IP address of the host machine, host B 326b, on which the resource 312b is located). The networking stack 332a may identify this mapping 320a by communicating with a directory service 340.

The encapsulated data packet 342 is then transmitted over a communication interface 344 from host A 326a to host B 326b, and delivered to a networking stack 332b that is running on host B 326b (as shown in FIG. 3B). The networking stack 332b on host B 326b strips away the additional source address 334 and the additional destination address 336 from the encapsulated data packet 342. The networking stack 332b also accesses mapping information 338b to perform network address translation, thereby creating a translated data packet 346. The translated data packet 346 is shown in FIG. 3C. In particular, based on the mapping 320c between IP address X and IP address Z, the source address 348 of the translated data packet 346 is changed from IP address X (which was in the source address 328 of the initial data packet 322) to IP address Z. In addition, the port associated with the source address 348 is changed from port $P_{S1}$ (which was the port that was identified in the source address 328 of the initial data packet 322) to port $P_{S2}$. Changing the port in this manner allows the data packet 322 to be distinguished from other data packets sent by other resources in virtual network A 314a. Moreover, based on the mapping 320b between IP address Y and IP address W, the destination address 350 of the translated data packet 346 is changed from IP address Y (which was the destination address 330 of the initial data packet 322) to IP address W (which is the IP address of the resource 312b that is the intended destination of the initial data packet 322). The port associated with the destination address 350 (port $P_D$) is not changed, because that is the port on which the resource 312b is listening.

Once network address translation has been performed, the networking stack 332b routes the translated data packet 346 to the resource 312b in subnet B 316b, which receives and processes the translated data packet 346. The source address 348 of the translated data packet 346 includes IP address Z, which corresponds to virtual network B 314b. Thus, to the resource 312b in subnet B 316b (which receives the translated data packet 346), it appears as though the translated data packet 346 has been sent by an entity within virtual network B 314b.

Figure 4:
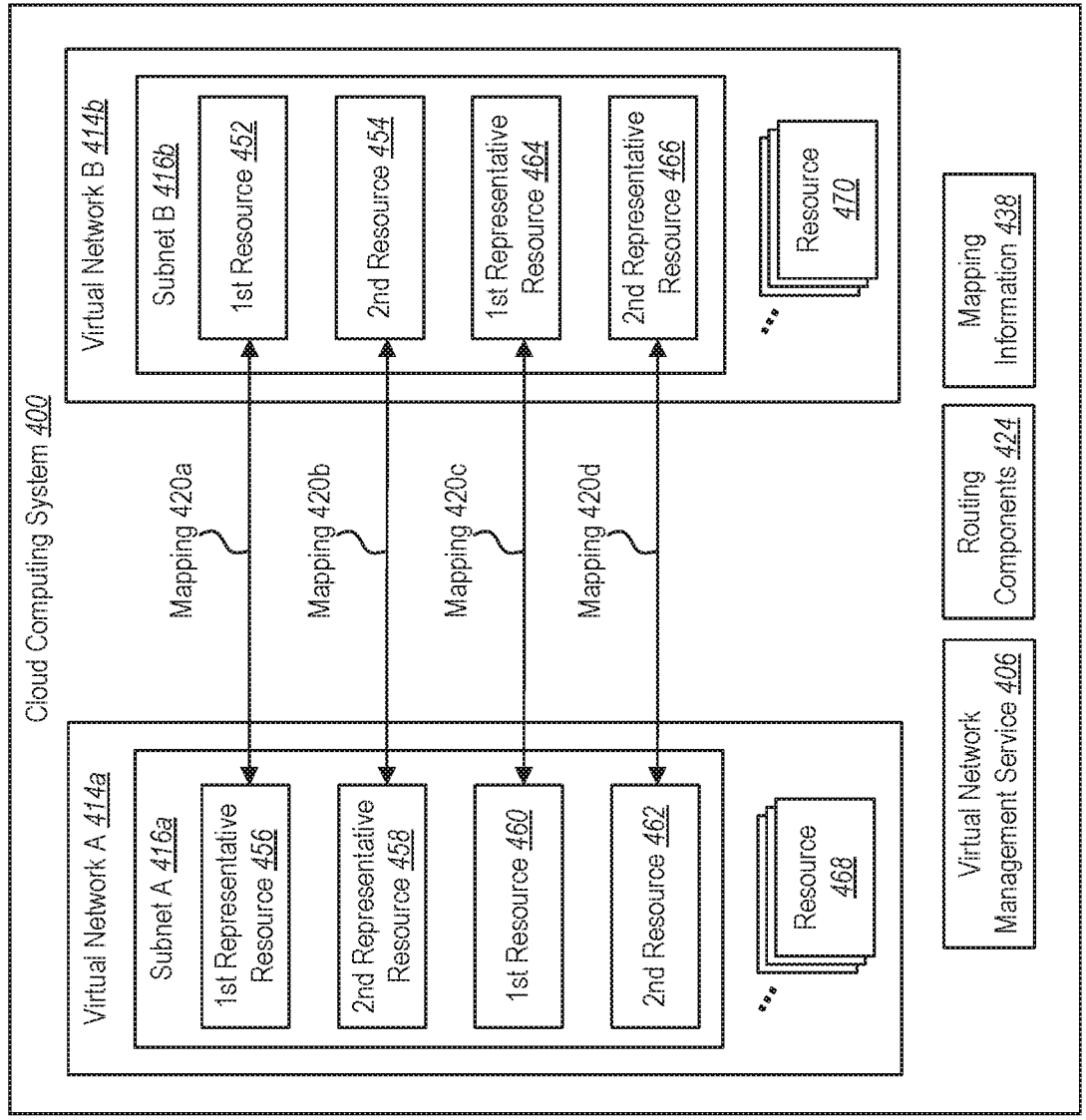
FIG. 4 illustrates an example in which a plurality of resources are shared between different virtual networks.

For the sake of simplicity, in the example shown in FIGS. 3A-3C, there is just one resource 312b in subnet B 316b. However, it may be desirable to expose a plurality of resources in virtual network B 314b to virtual network A 314a, and vice versa. FIG. 4 illustrates an example in which subnet mapping facilitates access to a plurality of resources.

As in the previous example, the cloud computing system 400 shown in FIG. 4 includes two virtual networks: virtual network A 414a and virtual network B 414b. Virtual network A 414a includes a subnet that will be referred to as subnet A 416a. Virtual network B 414b includes a subnet that will be referred to as subnet B 416b. For purposes of the present example, it will be assumed that subnet A 416a and subnet B 416b are mapped to one another.

FIG. 4 shows a first resource 452 and a second resource 454 in subnet B 416b. When these resources 452, 454 are added to subnet B 416b, representative resources 456, 458 may be created in subnet A 416a. These representative resources 456, 458 may be mapped to the resources 452, 454 in subnet B 416b. In other words, a one-to-one mapping 420a may be created between the first representative resource 456 in subnet A 416a and the first resource 452 in subnet B 416b, and a one-to-one mapping 420b may be created between the second representative resource 458 in subnet A 416a and the second resource 454 in subnet B 416b.

FIG. 4 also shows a first resource 460 and a second resource 462 in subnet A 416a. When these resources 460, 462 are added to subnet A 416a, representative resources 464, 466 may be created in subnet B 416b. These representative resources 464, 466 may be mapped to the resources 460, 462 in subnet A 416a. In particular, a one-to-one mapping 420c may be created between the first representative resource 464 in subnet B 416b and the first resource 460 in subnet A 416a, and a one-to-one mapping 420d may be created between the second representative resource 466 in subnet B 416b and the second resource 462 in subnet A 416a.

In some implementations, the representative resources 456, 458, 464, 466 may be automatically created by the cloud computing system 400 (e.g., by a virtual network management service 406 provided by the cloud computing system 400) in response to the resources 452, 454, 460, 462 being added to a mapped subnet. For example, once the user causes subnet B 416b to be mapped to subnet A 416a and causes the first resource 452 and the second resource 454 to be added to subnet B 416b, the representative resources 456, 458 may be created in subnet A 416a without additional input from the user. In addition, the relevant mappings (i.e., the mapping 420a between the first representative resource 456 in subnet A 416a and the first resource 452 in subnet B 416b, and the mapping 420b between the second representative resource 458 in subnet A 416a and the second resource 454 in subnet B 416b) may also be created automatically in response to the resources 452, 454 being added to subnet B 416b. Similarly, once the user causes the first resource 460 and the second resource 462 to be added to subnet A 416a, the representative resources 464, 466 may be created in subnet B 416b without additional input from the user. In addition, the relevant mappings (i.e., the mapping 420c between the first representative resource 464 in subnet B 416b and the first resource 460 in subnet A 416a, and the mapping 420d between the second representative resource 466 in subnet B 416b and the second resource 462 in subnet A 416a) may also be created automatically in response to the resources 460, 462 being added to subnet A 416a.

A resource 468 in virtual network A 414a may communicate with a resource in subnet B 416b of virtual network B 414b by sending a data packet to the corresponding representative resource in subnet A 416a. For example, a resource 468 in virtual network A 414a may communicate with the first resource 452 in subnet B 416b by sending a data packet to the IP address associated with the first representative resource 456 in subnet A 416a. The mapping 420a between the first representative resource 456 and the first resource 452 enables the data packet to be routed from the first representative resource 456 to the first resource 452. In a similar manner, a resource 468 in virtual network A 414a may communicate with the second resource 454 in subnet B 416b by sending a data packet to the IP address associated with the second representative resource 458 in subnet A 416a. The mapping 420b between the second representative resource 458 and the second resource 454 enables the data packet to be routed from the second representative resource 458 to the second resource 454.

Similarly, a resource 470 in virtual network B 414b may communicate with a resource in subnet A 416a of virtual network A 414a by sending a data packet to the corresponding representative resource in subnet B 416b. For example, a resource 470 in virtual network B 414b may communicate with the first resource 460 in subnet A 416a by sending a data packet to the IP address associated with the first representative resource 464 in subnet B 416b. The mapping 420c between the first representative resource 464 and the first resource 460 enables the data packet to be routed from the first representative resource 464 to the first resource 460. In a similar manner, a resource 470 in virtual network B 414b may communicate with the second resource 462 in subnet A 416a by sending a data packet to the IP address associated with the second representative resource 466 in subnet B 416b. The mapping 420d between the second representative resource 466 and the second resource 462 enables the data packet to be routed from the second representative resource 466 to the second resource 462.

The cloud computing system 400 may include routing components 424 that access mapping information 438 in order to route data packets in the manner described above.

In some implementations, the routing components 424 and the mapping information 438 may be included as part of a networking stack that is included on host machines within the cloud computing system 400.

A virtual network that is created by a cloud computing system may include resources that exist independently of the cloud computing system. For example, resources within a network that exists independently of the cloud computing system may be included in a virtual network. An example of such a network is a network (e.g., a local area network) that is maintained and operated by a customer of the service provider. This type of network may be referred to as an on-premises network to indicate that the network exists at one or more locations (e.g., the customer's premises) that are separate from the cloud computing system. A virtual network management service provided by a cloud computing system may permit resources in an on-premises network to be added to a virtual network that is created by the virtual network management service.

Figure 5:
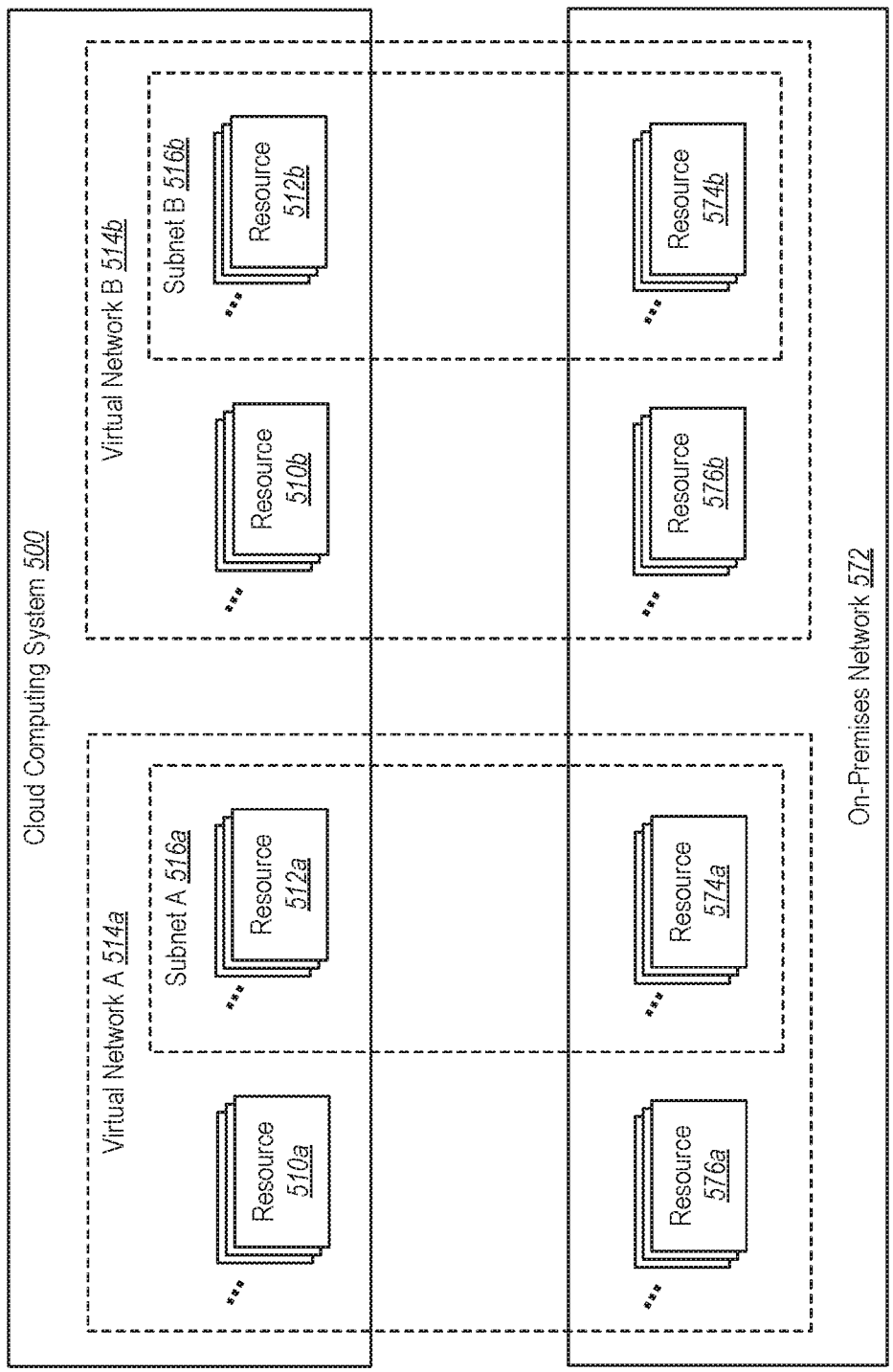
FIG. 5 illustrates an example in which mapped subnets include resources from a network that exists independently of the cloud computing system.

FIG. 5 illustrates an example in which mapped subnets include resources from a network 572 that exists independently of the cloud computing system 500. The on-premises network 572 includes a plurality of resources 574a-b, 576a-b. The resources 574a-b, 576a-b may take the form of computing devices within the on-premises network 572.

As in the examples discussed previously, the cloud computing system 500 shown in FIG. 5 includes two virtual networks: virtual network A 514a and virtual network B 514b. Virtual network A 514a includes subnet A 516a, and virtual network B 514b includes subnet B 516b. Subnet A 516a is mapped to subnet B 516b. Because of this mapping between subnet A 516a and subnet B 516b, the resources 510a, 510b in virtual network A 514a are able to interact with the resources 512b in virtual network B 514b that have been added to subnet B 516b. However, the other resources 510b in virtual network B 514b remain isolated from virtual network A 514a. Similarly, the resources 510b, 512b in virtual network B 514b are able to interact with the resources 512a in virtual network A 514a that have been added to subnet A 516a. However, the other resources 510a in virtual network A 514a remain isolated from virtual network B 514b.

Some of the resources 574a, 576a in the on-premises network 572 may be added to virtual network A 514a. Some of the resources 574a that are added to virtual network A 514a may be added to subnet A 516a. Because of the mapping between subnet A 516a and subnet B 516b, the resources 510b, 512b in virtual network B 514b are able to interact with the resources 574a in the on-premises network 572 that are added to subnet A 516a. However, the other resources 576a in the on-premises network 572 that have been added to virtual network A 514a but not subnet A 516a remain isolated from virtual network B 514b.

Similarly, some of the resources 574b, 576b in the on-premises network 572 may be added to virtual network B 514b. Some of the resources 574b that are added to virtual network B 514b may be added to subnet B 516b. Because of the mapping between subnet A 516a and subnet B 516b, the resources 510a, 512a in virtual network A 514a are able to interact with the resources 574b in the on-premises network 572 that are added to subnet B 516b. However, the other resources 576b in the on-premises network 572 that have been added to virtual network B 514b but not subnet B 516b remain isolated from virtual network A 514a.

As described above, in a cloud computing system that includes virtual networks with mapped subnets, it may be desirable to share a plurality of resources in one virtual network with another virtual network. One way to accomplish this is to add all of the resources to a mapped subnet. For example, if a user would like to share resources A, B, and C in a virtual network with another virtual network, each of those resources may be added to a mapped subnet in the virtual network. This causes a representative resource for each shared resource (i.e., a representative resource for resource A, a representative resource for resource B, and a representative resource for resource C) to be created in a corresponding mapped subnet in the other virtual network.

Alternatively, a resource that represents the resources to be shared may be added to a mapped subnet. This representative resource may be referred to as a gateway resource. For example, instead of adding resources A, B, and C to the mapped subnet, a gateway resource D may be added to the mapped subnet. A single representative resource corresponding to gateway resource D may then be created in the mapped subnet in the other virtual network. Data packets that are destined for resources A, B, and C may include additional information that enables the gateway resource D to forward the data packets to the intended destination.

Figure 6:
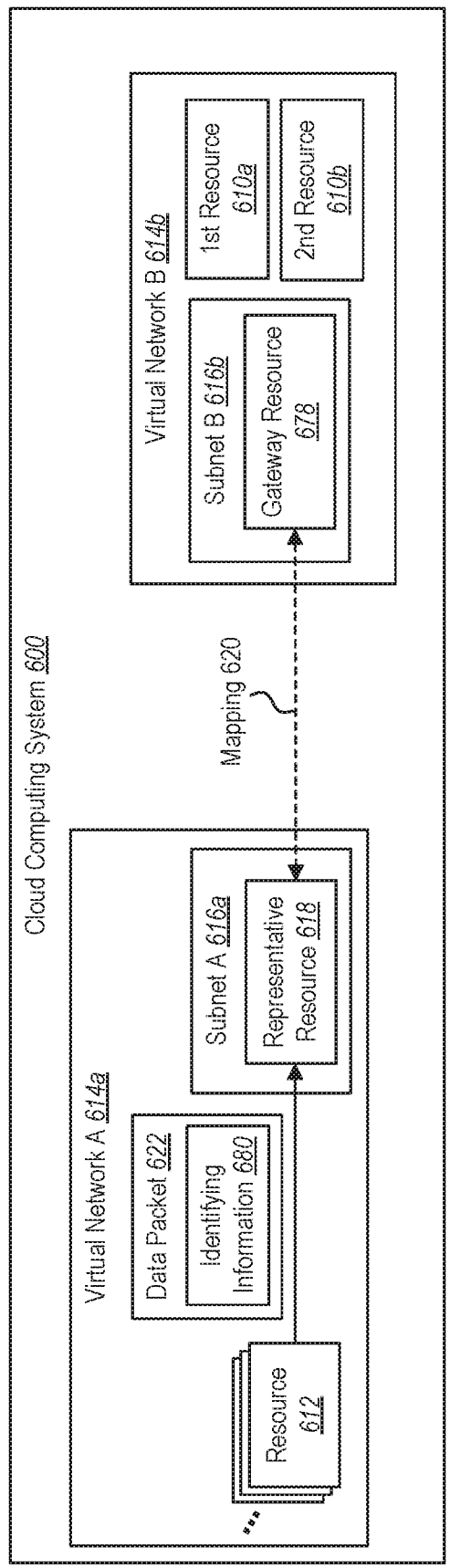
FIG. 6 illustrates an example in which a single resource represents a plurality of resources to be shared.

FIG. 6 illustrates an example involving a gateway resource 678. As in the examples discussed previously, the cloud computing system 600 shown in FIG. 6 includes two virtual networks: virtual network A 614a and virtual network B 614b. Virtual network A 614a includes subnet A 616a, and virtual network B 614b includes subnet B 616b. Subnet A 616a is mapped to subnet B 616b.

In the example discussed above in connection with FIG. 4, a plurality of resources 452, 454 are added to subnet B 416b. When these resources 452, 454 are added to subnet B 416b, representative resources 456, 458 are created in subnet A 416a. These representative resources 456, 458 are mapped to the resources 452, 454 in subnet B 416b. A resource 468 in virtual network A 414a may communicate with a resource in subnet B 416b of virtual network B 414b by sending a data packet to the corresponding representative resource in subnet A 416a. For example, a resource 468 in virtual network A 414a may communicate with the first resource 452 in subnet B 416b by sending a data packet to the IP address associated with the first representative resource 456 in subnet A 416a. The mapping 420a between the first representative resource 456 and the first resource 452 enables the data packet to be routed from the first representative resource 456 to the first resource 452.

By contrast, in the example shown in FIG. 6, the resources 610a-b themselves are not added to subnet B 616b. Instead, a gateway resource 678 that represents the resources 610a-b is added to subnet B 616b. When the gateway resource 678 is added to subnet B 616b, a representative resource 618 is created in subnet A 616a. A one-to-one mapping 620 is created between the gateway resource 678 and the corresponding representative resource 218 in subnet A 616a.

A resource 612 in virtual network A 614a may communicate with one of the resources 610a-b in virtual network B 614b by sending a data packet 622 to the representative resource 618 in subnet A 616a. The data packet 622 may include additional identifying information 680 that enables the gateway resource 678 to forward the data packet 622 (or at least the relevant contents of the data packet 622) to the intended resource. For example, a resource 612 in virtual network A 614a may communicate with the first resource 610a in virtual network B 614b by sending a data packet 622 to the IP address associated with the representative resource 618 in subnet A 616a. The mapping 620 between the representative resource 618 and the gateway resource 678 enables the data packet 622 to be routed from the representative resource 618 to the gateway resource 678. The gateway resource 678 may then use the identifying information 680 in the data packet 622 to determine which of the resources 610a-b in virtual network B 614b should receive the data packet 622 (or some portion thereof).

Figure 7:
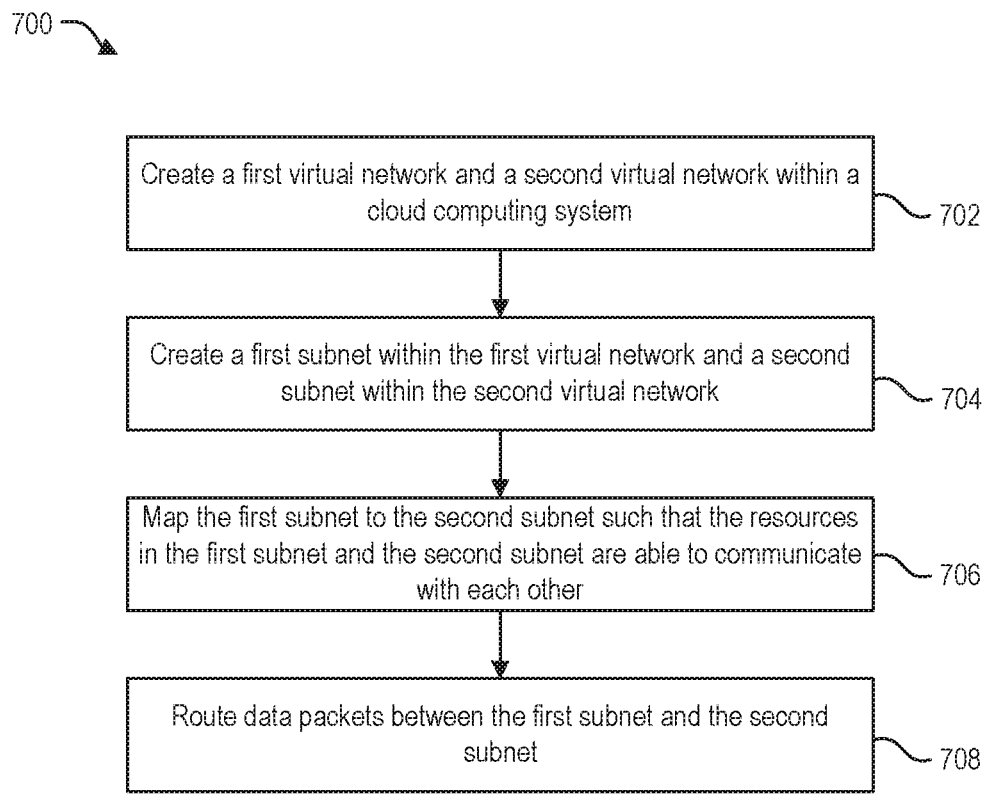
FIG. 7 illustrates an example of a method for facilitating communication between resources in different virtual networks in accordance with the present disclosure.

FIG. 7 illustrates an example of a method 700 for facilitating communication between resources in different virtual networks 414a-b. The method 700 will be described in relation to the cloud computing system 400 that is shown in FIG. 4.

The method 700 includes creating 702 a first virtual network (e.g., virtual network A 414a) and a second virtual network (e.g., virtual network B 414b) within a cloud computing system 400. A plurality of resources (e.g., resources 460, 462, 468) may be assigned to the first virtual network 414a, and a plurality of resources (e.g., resources 452, 454, 470) may be assigned to the second virtual network 414b. The method 700 also includes creating 704 a first subnet (e.g., subnet A 416a) within the first virtual network 414a and a second subnet (e.g., subnet B 416b) within the second virtual network 414b.

The method 700 also includes mapping 706 the first subnet 416a and the second subnet 416b to each other to enable resources in the first subnet 416a and resources in the second subnet 416b to communicate with each other. Some resources (e.g., resources 460, 462) within the first virtual network 414a may be added to the first subnet 416a, and some resources (e.g., resources 452, 454) within the second virtual network 414b may be added to the second subnet 416b. The resources in the first virtual network 414a are then able to interact with the resources 452, 454 that have been added to the second subnet 416b in the second virtual network 414b. However, the first virtual network 414a remains unaware of the other resources 470 in the second virtual network 414b (i.e., the resources 470 in the second virtual network 414b that have not been added to the second subnet 416b). Therefore, these other resources 470 remain isolated from the first virtual network 414a. Similarly, the resources in the second virtual network 414b are then able to interact with the resources 460, 462 that have been added to the first subnet 416a in the first virtual network 414a. However, the second virtual network 414b remains unaware of the other resources 468 in the first virtual network 414a (i.e., the resources 468 in the first virtual network 414a that have not been added to the first subnet 416a). Therefore, these other resources 468 remain isolated from the second virtual network 414b.

The method 700 also includes routing 708 data packets between the first subnet 416a and the second subnet 416b. For example, if a resource 468 in the first virtual network 414a sends a data packet to the IP address associated with a representative resource 456 in the first subnet 416a, that data packet may be routed from the representative resource 456 in the first subnet 416a to the corresponding resource 452 in the second subnet 416b based on mapping information 438. Conversely, if a resource 470 in the second virtual network 414b sends a data packet to the IP address associated with a representative resource 464 in the second subnet 416b, that data packet may be routed from the representative resource 464 in the second subnet 416b to the corresponding resource 460 in the first subnet 416a based on mapping information 438.

Figure 8:
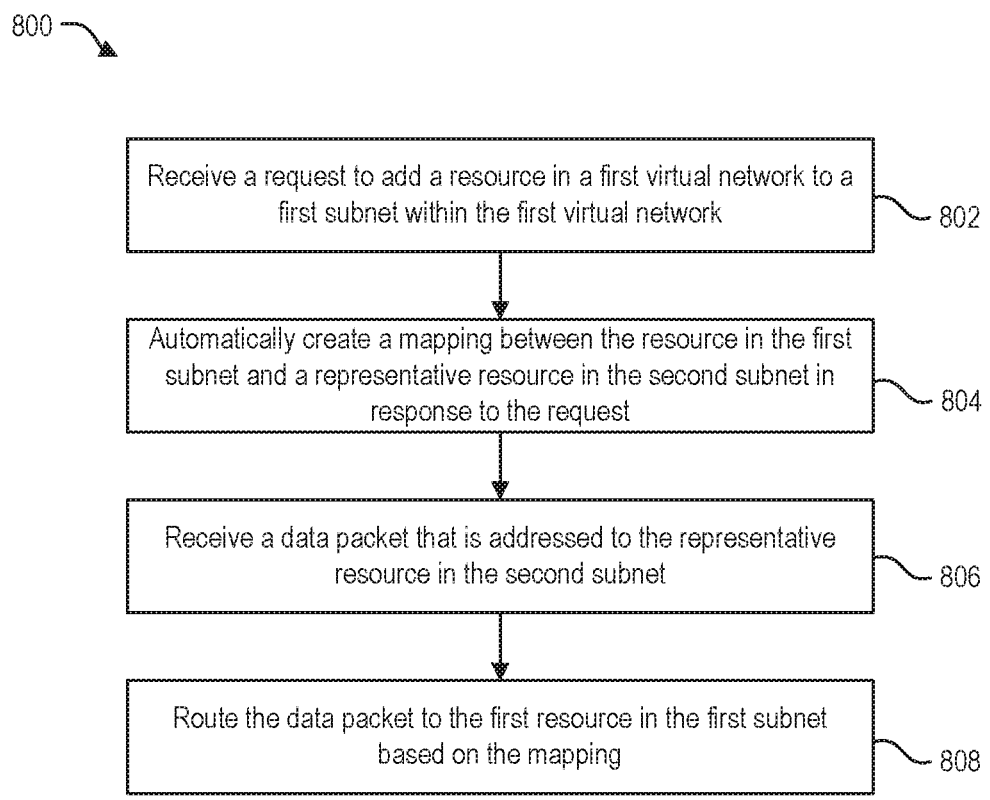
FIG. 8 illustrates an example of a method in which a mapping is automatically created between a resource in a subnet and a representative resource in another subnet.

FIG. 8 illustrates another example of a method 800 for facilitating communication between resources in different virtual networks 414a-b. The method 800 will be described in relation to the cloud computing system 200 that is shown in FIG. 2.

The method 800 includes receiving 802 a request to add a resource 212b in a virtual network (e.g., virtual network B 214b) to a subnet (e.g., subnet B 216b) within the virtual network 214b. The request may be received from a user of the cloud computing system 200 via a front-end application that is running on a client device.

In response to receiving the request, the method 800 also includes automatically creating 804 a mapping 220 between the resource 212b in the subnet 216b and a representative resource 218 in another subnet (e.g., subnet A 216a) that is mapped to the subnet 216b. The other subnet 216a corresponds to another virtual network 214a within the cloud computing system 200.

The mapping 220 facilitates routing of data packets between the subnets 216a-b. For example, when a data packet 222 that is addressed to the representative resource 218 in the other subnet 216a is received 806 (e.g., after being sent by another resource 210a in the other subnet 216a), the data packet 222 may be routed to the corresponding resource 212b in the subnet 216b based on the mapping 220.

As discussed above, the techniques disclosed herein may be implemented via a cloud computing system. Cloud computing systems are built using principles of distributed systems. A distributed computing system is a type of computing system whose components are located on multiple computing devices. For example, a distributed computing system may include a plurality of distinct processing, memory, storage, and communication components that are connected by one or more communication networks. The various components of a distributed computing system may communicate with one another in order to coordinate their actions.

Figure 9:
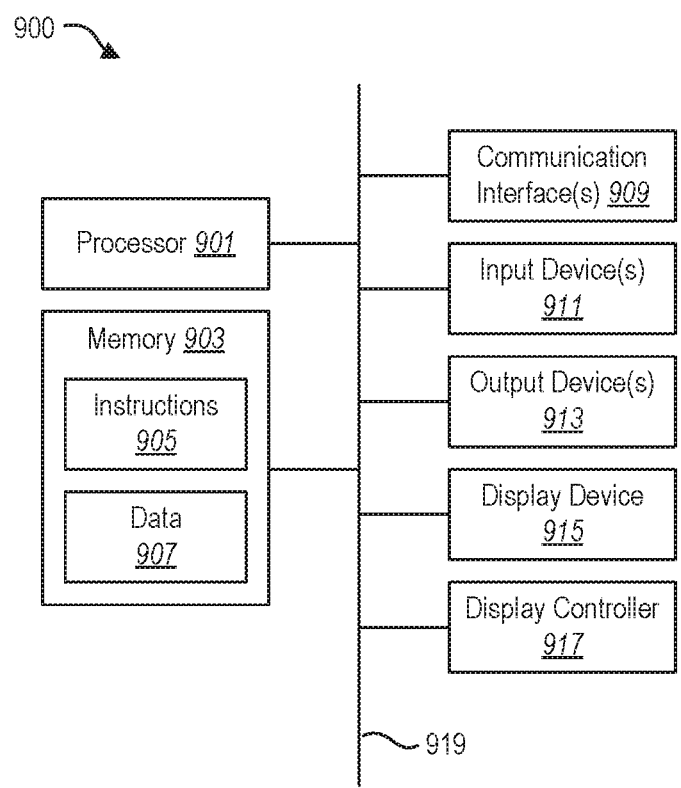
FIG. 9 illustrates certain components that may be included within a computing system.

Thus, a plurality of interconnected computing systems may be used to facilitate communication between resources in different virtual networks in accordance with the present disclosure. FIG. 9 illustrates certain components that may be included within a computing system 900.

The computing system 900 includes a processor 901. The processor 901 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computing system 900 of FIG. 9, in an alternative configuration, a combination of processors (e.g., an ARM and DSP) could be used.

The computing system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor 901, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the methods, steps, operations, actions, or other functionality that is disclosed herein. Executing the instructions 905 may involve the use of the data 907 that is stored in the memory 903. Unless otherwise specified, any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

The computing system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 900 may also include one or more input devices 911 and one or more output devices 913. Some examples of input devices 911 include a keyboard, mouse, microphone, remote control device, button, joystick, trackball, touchpad, and lightpen. One specific type of output device 913 that is typically included in a computing system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915. The computing system 900 may also include other types of output devices 913, such as a speaker, a printer, etc.

The various components of the computing system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for facilitating communication between a first resource in a first virtual network and a second resource in a second virtual network, the first resource running on a first host machine having a first host machine address, and the second resource running on a second host machine having a second host machine address, the method comprising:
   mapping a first subnet in the first virtual network to a second subnet in the second virtual network such that resources in the first subnet and the second subnet are able to communicate with each other;
   placing the second resource in the second subnet of the second virtual network;
   creating a representative resource in the first subnet of the first virtual network, wherein the representative resource corresponds to the second resource in the second subnet of the second virtual network;
   creating a plurality of mappings comprising:
      a first mapping between a representative resource address and the second host machine address, wherein the representative resource address corresponds to the representative resource in the first subnet;
      a second mapping between the representative resource address and a resource address corresponding to the second resource in the second subnet; and
      a third mapping between an address of the first resource in the first virtual network and a source address that is associated with the second virtual network;
   encapsulating a data packet that originates from the first resource in the first virtual network based at least in part on the first mapping, the encapsulating being performed by a first networking stack running on the first host machine;
   performing network address translation at the second virtual network based at least in part on the second mapping and the third mapping, the network address translation being performed by a second networking stack running on the second host machine, the network address translation producing a translated data packet; and causing the translated data packet to be delivered to the second resource in the second subnet.

2. The method of claim 1, wherein:
at least some resources in the first virtual network that are outside the first subnet are isolated from the second virtual network; and
at least some resources in the second virtual network that are outside the second subnet are isolated from the first virtual network.

3. The method of claim 1, further comprising:
mapping a first plurality of resources in the first subnet to a first plurality of representative resources in the second subnet; and
mapping a second plurality of resources in the second subnet to a second plurality of representative resources in the first subnet.

4. The method of claim 1, wherein a first address space associated with the first virtual network overlaps with a second address space associated with the second virtual network.

5. The method of claim 1, wherein communication between the resources in the first subnet and the second subnet occurs within private Internet protocol (IP) address space.

6. The method of claim 1, wherein:
the data packet comprises a first source address and a first destination address;
the first source address is associated with the first resource in the first virtual network;
the first destination address is associated with the representative resource in the first subnet in the first virtual network; and
the encapsulating creates an encapsulated data packet that comprises an additional destination address based at least in part on the first mapping.

7. The method of claim 1, wherein:
the data packet comprises a first source address and a first destination address;
the first source address is associated with the first resource in the first virtual network; and
the first destination address is associated with the representative resource in the first subnet in the first virtual network.

8. The method of claim 7, wherein performing network address translation comprises:
accessing the second mapping between the representative resource address and the resource address to determine a second destination address;
replacing the first destination address with the second destination address;
accessing the third mapping between the address of the first resource in the first virtual network and the source address that is associated with the second virtual network; and
replacing the first source address with the source address.

9. The method of claim 1, further comprising receiving a request from a client device to map the first subnet to the second subnet, wherein the mapping is performed in response to the request.

10. A cloud computing system comprising a first virtual network and a second virtual network, comprising:
one or more processors; and
a virtual network management service that facilitates communication between a first resource in the first virtual network and a second resource in the second virtual network, the first resource running on a first host machine having a first host machine address, and the second resource running on a second host machine having a second host machine address, the virtual network management service comprising instructions that are executable by the one or more processors to:
map a first subnet in the first virtual network to a second subnet in the second virtual network such that resources in the first subnet and the second subnet are able to communicate with each other;
place the second resource in the second subnet of the second virtual network;
create a representative resource in the first subnet of the first virtual network, wherein the representative resource corresponds to the second resource in the second subnet of the second virtual network;
create a plurality of mappings comprising:
a first mapping between a representative resource address and the second host machine address, wherein the representative resource address corresponds to the representative resource in the first subnet;
a second mapping between the representative resource address and a resource address corresponding to the second resource in the second subnet; and
a third mapping between an address of the first resource in the first virtual network and a source address that is associated with the second virtual network;
encapsulate a data packet that originates from the first resource in the first virtual network based at least in part on the first mapping, the encapsulating being performed by a first networking stack running on the first host machine;
perform network address translation at the second virtual network based at least in part on the second mapping and the third mapping, the network address translation being performed by a second networking stack running on
the second host machine, the network address translation producing a translated data packet; and
cause the translated data packet to be delivered to the second resource in the second subnet.

11. The cloud computing system of claim 10, wherein:
at least some resources in the first virtual network that are outside the first subnet are isolated from the second virtual network; and
at least some resources in the second virtual network that are outside the second subnet are isolated from the first virtual network.

12. The cloud computing system of claim 10, wherein a first address space associated with the first virtual network overlaps with a second address space associated with the second virtual network.

13. The cloud computing system of claim 10, wherein causing the translated data packet to be delivered to the second resource in the second subnet occurs within private Internet protocol (IP) address space.

14. The cloud computing system of claim 10, wherein the plurality of mappings further comprise:
a first set of mappings between a first plurality of resources in the first subnet and a first plurality of representative resources in the second subnet; and
a second set of mappings between a second plurality of resources in the second subnet and a second plurality of representative resources in the first subnet.

15. A non-transitory computer-readable medium that is configured to facilitate communication between a first resource in a first virtual network and a second resource in a second virtual network, the first resource running on a first host machine having a first host machine address, and the second resource running on a second host machine having a second host machine address, the computer-readable medium comprising instructions that are executable by one or more processors to:

map a first subnet in the first virtual network to a second subnet in the second virtual network such that resources in the first subnet and the second subnet are able to communicate with each other;

place the second resource in the second subnet of the second virtual network;

create a representative resource in the first subnet of the first virtual network, wherein the representative resource corresponds to the second resource in the second subnet of the second virtual network;

create a plurality of mappings comprising:
        a first mapping between a representative resource address and the second host machine address, wherein the representative resource address corresponds to the representative resource in the first subnet;
        a second mapping between the representative resource address and a resource address corresponding to the second resource in the second subnet; and
        a third mapping between an address of the first resource in the first virtual network and a source address that is associated with the second virtual network;

encapsulate a data packet that originates from the first resource in the first virtual network based at least in part on the first mapping, the encapsulating being performed by a first networking stack running on the first host machine;

perform network address translation at the second virtual network based at least in part on the second mapping and the third mapping, the network address translation being performed by a second networking stack running on the second host machine, the network address translation producing a translated data packet; and cause the translated data packet to be delivered to the second resource in the second subnet.

16. The non-transitory computer-readable medium of claim 15, wherein:

at least some resources in the first virtual network that are outside the first subnet are isolated from the second virtual network; and at least some resources in the second virtual network that are outside the second subnet are isolated from the first virtual network.

17. The non-transitory computer-readable medium of claim 15, further comprising additional instructions that are executable by the one or more processors to:

map a first plurality of resources in the first subnet to a first plurality of representative resources in the second subnet; and map a second plurality of resources in the second subnet to a second plurality of representative resources in the first subnet.

18. The non-transitory computer-readable medium of claim 15, wherein a first address space associated with the first virtual network overlaps with a second address space associated with the second virtual network.

19. The non-transitory computer-readable medium of claim 15, wherein communication between the resources in the first subnet and the second subnet occurs within private Internet protocol (IP) address space.

20. The non-transitory computer-readable medium of claim 15, wherein:

the data packet comprises a first source address and a first destination address;

the first source address is associated with the first resource in the first virtual network;

the first destination address is associated with the representative resource in the first subnet in the first virtual network; and the encapsulating creates an encapsulated data packet that comprises an additional destination address based at least in part on the first mapping.

\* \* \* \* \*